US009395598B2

(12) United States Patent
Takahashi et al.

(10) Patent No.: US 9,395,598 B2
(45) Date of Patent: Jul. 19, 2016

(54) FOCAL PLANE SHUTTER, IMAGING DEVICE AND DIGITAL CAMERA

(71) Applicant: SEIKO PRECISION INC., Narashino-shi (JP)

(72) Inventors: Hiroshi Takahashi, Narashino (JP); Minori Murata, Narashino (JP); Seiichi Oishi, Narashino (JP); Mitsuru Suzuki, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/325,716

(22) Filed: Jul. 8, 2014

(65) Prior Publication Data

US 2014/0320737 A1    Oct. 30, 2014

Related U.S. Application Data

(63) Continuation of application No. PCT/JP2013/053058, filed on Feb. 8, 2013.

(30) Foreign Application Priority Data

Jun. 15, 2012    (JP) ................................ 2012-136062

(51) Int. Cl.
*H04N 5/235* (2006.01)
*G03B 9/10* (2006.01)
(Continued)

(52) U.S. Cl.
CPC .. *G03B 9/14* (2013.01); *G03B 9/36* (2013.01); *H04N 5/238* (2013.01)

(58) Field of Classification Search
CPC .................................. H04N 5/238; G03B 9/14

USPC .......................................... 348/367; 396/469
See application file for complete search history.

(56) References Cited

U.S. PATENT DOCUMENTS 4,220,409 A    9/1980  Inoue
4,487,492 A *  12/1984  Toyoda et al. ................ 396/466
(Continued)

FOREIGN PATENT DOCUMENTS

CN    101432952 A    5/2009
JP    S53-87218      8/1978
(Continued)

OTHER PUBLICATIONS

International Search Report for International Application No. PCT/JP2013/053058 dated May 21, 2013.
(Continued)

*Primary Examiner* — Joel Fosselman
(74) *Attorney, Agent, or Firm* — Kratz, Quintos & Hanson, LLP

(57) ABSTRACT

A focal plane shutter includes: a board including an opening; a leading shutter and a trailing shutter opening and closing the opening; first and second biasing members respectively biasing the leading shutter and the trailing shutter to move away from the opening; a first actuator causing the leading shutter to move from a position to close the opening to a position to recede from the opening while the leading shutter is assisted by a biasing force of the first biasing member in an exposure operation; and a second actuator causing the trailing shutter to move from a position to recede from the opening to a position to close the opening against a biasing force of the second biasing member in the exposure operation, wherein drive torque of the first actuator is smaller than that of the second actuator.

5 Claims, 5 Drawing Sheets

(51) Int. Cl.
*G03B 9/14* (2006.01)
*G03B 9/36* (2006.01)
*H04N 5/238* (2006.01)

(56) References Cited

U.S. PATENT DOCUMENTS

| | | | |
|---|---|---|---|
| 2002/0069025 A1 | 6/2002 | Wang | |
| 2007/0172231 A1 | 7/2007 | Durfee | |
| 2007/0242950 A1 | 10/2007 | Tenmyo | |
| 2012/0033961 A1* | 2/2012 | Chung | G03B 9/08 396/463 |

FOREIGN PATENT DOCUMENTS

| | | |
|---|---|---|
| JP | H03-29837 | 3/1991 |
| JP | H07-20523 | 1/1995 |
| JP | H11-258656 A | 9/1999 |
| JP | 2000-284339 A | 10/2000 |
| JP | 2002-43227 A1 | 2/2002 |
| JP | 2003-005252 A | 1/2003 |
| JP | 2005-151637 A1 | 6/2005 |
| JP | 2005-304221 A | 10/2005 |
| JP | 2006-126515 A1 | 5/2006 |
| JP | 2007-286443 A1 | 11/2007 |
| JP | 2008-092741 A | 4/2008 |
| JP | 3176166 U | 6/2012 |
| KR | 2012-0013595 A | 2/2012 |

OTHER PUBLICATIONS

JP 2012-136062: Notification of Reason(s) for Refusal dated Oct. 20, 2015.
KR 10-2014-7019595: Notification of Submission of Opinion dated Nov. 10, 2015.
Office Action issued on Apr. 12, 2016 in corresponding Japanese patent application No. 2012-136062, with English translation.
Office Action issued on Apr. 13, 2016 in the corresponding Chinese patent application No. 201380007547.8, with translation.
Office Action issued May 18, 2016 in Korean Patent Application No. 10-2014-7019595, with translation.

* cited by examiner

FOCAL PLANE SHUTTER, IMAGING DEVICE AND DIGITAL CAMERA

CROSS-REFERENCE TO RELATED APPLICATION

This application is a continuation of and claims priority to International Patent Application. No. PCT/JP2013/053058 filed on Feb. 8, 2013, which claims priority to Japanese Patent Application No. 2012-136062 filed on Jun. 15, 2012, subject matter of these patent documents is incorporated by reference herein in its entirety.

BACKGROUND (i) Technical Field

The present invention relates to focal plane shutters, imaging devices, and digital cameras.

(ii) Related Art

Japanese Unexamined Patent Application Publication (Translation of PCT Application) No. 2002-043227 discloses a focal plane shutter equipped with first and second actuators that respectively drive a leading shutter and a trailing shutter. In such a shutter, after the leading shutter closes an opening and the trailing shutter recedes from the opening, the leading shutter moves away from the opening and the trailing shutter closes the opening, whereby an exposure operation is performed.

In such a shutter, in order to maintain a state where the leading shutter and the trailing shutter recede away from the opening, it is conceivable that first and second biasing members respectively bias the leading shutter and the trailing shutter to be away from the opening. In such a case, in the exposure operation, the direction in which the leading shutter is moved away from the opening by the first actuator is the same as the direction in which the leading shutter is biased by the first biasing member. However, the direction in which the trailing shutter is moved toward the opening by the second actuator is opposite to the direction in which the trailing shutter is biased by the second biasing member. Therefore, the load on the first actuator differs from that on the second actuator. Thus, for example, when the continuous shooting is performed for a predetermined period, the driving properties of the first and second actuators might be changed, so that the shutter speed might be changed.

SUMMARY

It is therefore an object of the present invention to provide a focal plane shutter, an imaging device, and a digital camera suppressing a change in shutter speed.

According to an aspect of the present invention, there is provided a focal plane shutter including: a board including an opening; a leading shutter and a trailing shutter opening and closing the opening; first and second biasing members respectively biasing the leading shutter and the trailing shutter to move away from the opening; a first actuator causing the leading shutter to move from a position to close the opening to a position to recede from the opening while the leading shutter is assisted by a biasing force of the first biasing member in an exposure operation; and a second actuator causing the trailing shutter to move from a position to recede from the opening to a position to close the opening against a biasing force of the second biasing member in the exposure operation, wherein drive torque of the first actuator is smaller than that of the second actuator.

DETAILED DESCRIPTION

Figure 1:
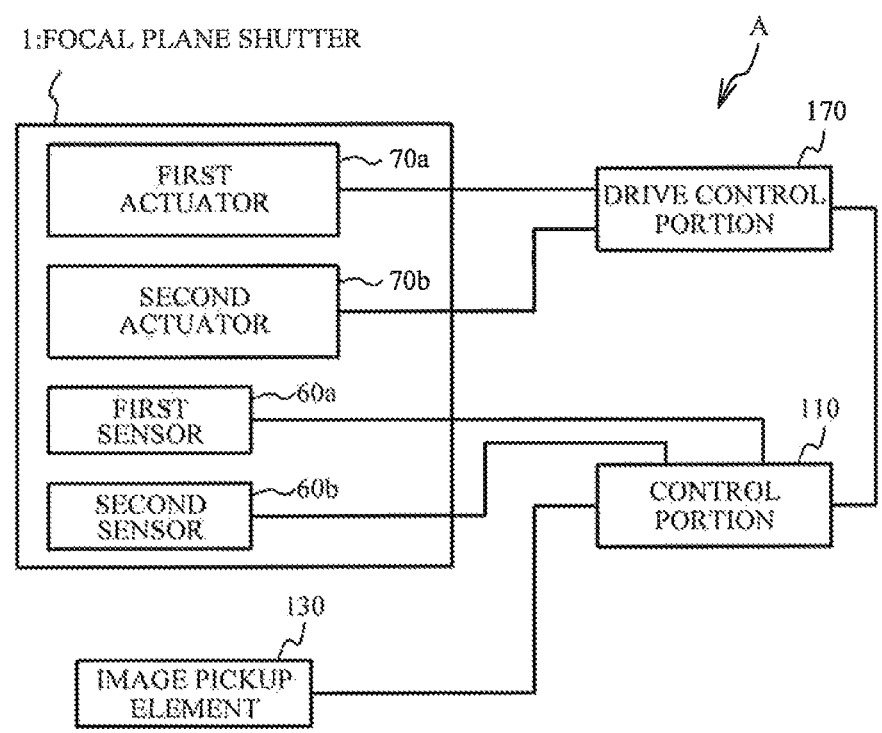
FIG. 1 is a block diagram of a camera including a focal plane shutter.

FIG. 1 is a block diagram of a camera (image pickup device) A including a focal plane shutter 1. The camera A includes the focal plane shutter 1, a control portion 110, an image pickup element 130, and a drive control portion 170. The focal plane shutter 1 includes a first actuator (hereinafter, referred to as actuator) 70a, a second actuator (hereinafter, referred to as actuator) 70b, a first sensor (hereinafter, referred as sensor) 60a, and a second sensor (hereinafter, referred as sensor) 60b, as will be described later in detail. The drive control portion 170 controls the drive of the actuators 70a and 70b in accordance with the instruction from the control portion 110. The drive control portion 170 includes a CPU. The control portion 110 instructs the drive control portion 170 in accordance with the signals from the sensors 60a and 60b. The drive control portion 170 receives this instruction to control the drive of the actuators 70a and 70b. The control portion 110 controls the operation of the whole camera, and includes the CPU, a ROM, and a RAM. The image pickup element 130 is a CMOS. The image pickup element 130 is a light receiving element that converts subject images into electric signals on the basis of photoelectric conversion. Moreover, the camera A includes lenses, not illustrated in FIG. 1, for adjusting a focal length.

Figure 2:
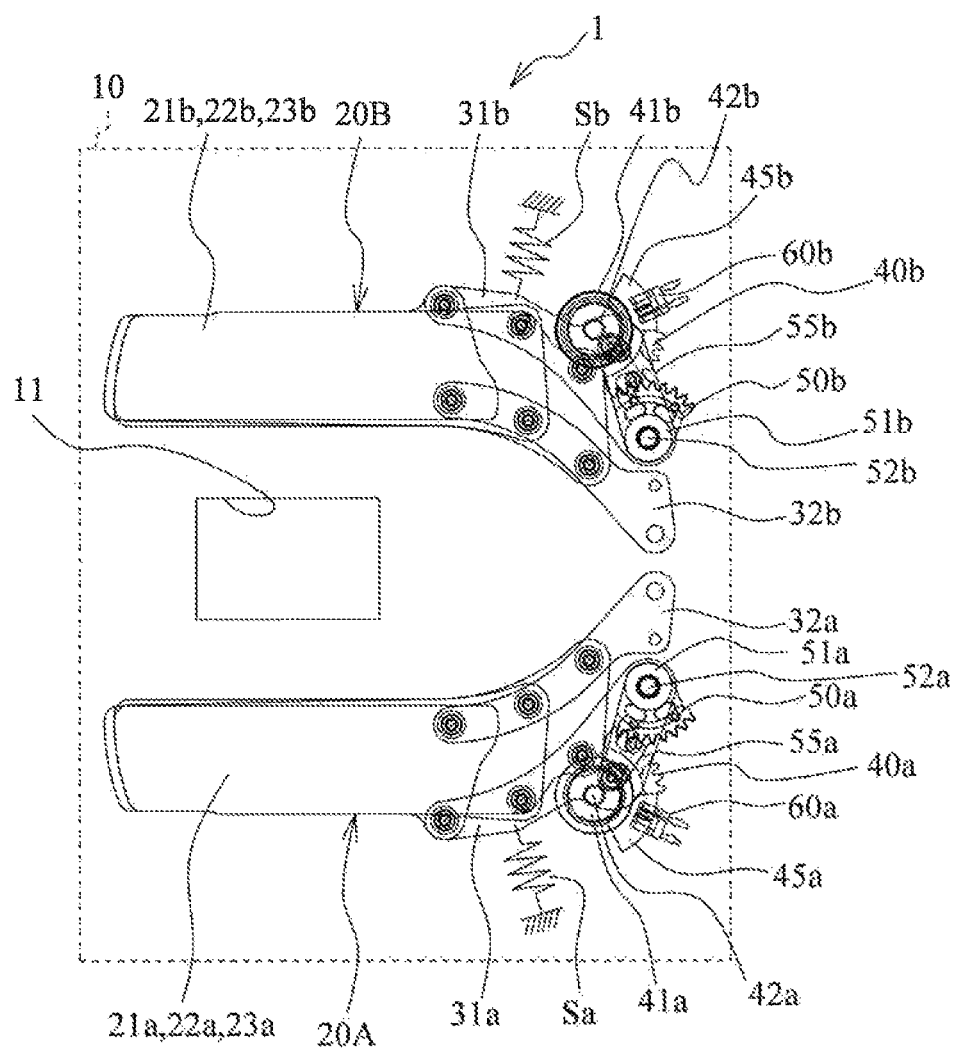
FIG. 2 is a front view of the focal plane shutter.

FIG. 2 is a front view of the focal plane shutter 1. In FIG. 2, the actuators 70a and 70b are omitted. The focal plane shutter 1 includes a board 10, a leading shutter 20A, a trailing shutter 20B, arms 31a, 32a, 31b, and 32b, and the actuators 70a and 70b. The board 10 is provided with a rectangular opening 11. The leading shutter 20A and the trailing shutter 20B are respective examples of first and second shutters. The actuators 70a and 70b are respective examples of first and second actuators.

The leading shutter 20A includes three blades 21a to 23a. The trailing shutter 20B includes three blades 21b to 23b. FIG. 2 illustrates the leading shutter 20A and the trailing shutter 20B in overlapped states. In FIG. 2, the leading shutter 20A and the trailing shutter 20B recedes from the opening 11. The leading shutter 20A is connected to the arms 31a and 32a. The trailing shutter 20B is connected to the arms 31b and 32b. These arms 31a, 32a, 31b, 32b are rotatably supported by the board 10.

The board 10 is provided with a first drive lever 55a (hereinafter, referred to as drive lever) and a second drive lever 55b (hereinafter, referred to as drive lever) for driving the arms 31a and 31b, respectively. The drive levers 55a and 55b are connected with gears 50a and 50b, respectively. The gears 50a and 50b engage gears 40a and 40b, respectively. The gears 40a, 40b, 50a, and 50b respectively include pipe portions 41a, 41b, 51a, and 51b, and are supported by the board 10 for rotation about spindles 42a, 42b, 52a, and 52b fitting into the pipe portions thereof, respectively. Additionally, the spindles 42a, 42b, 52a, and 52b do not have to be always formed on the board 10 in which the opening 11 is formed, and have only to be positionally fixed with respect to the opening 11.

The gears 40a and 40b are connected with rotors 72a and 72b of the actuators 70a and 70b, respectively. The driving of the actuator 70a drives the gears 40a and 50a, thereby driving the drive lever 55a. The driving of the drive lever 55a drives the arm 31a. Thus, the leading shutter 20A moves. The leading shutter 20A is movable between a receded position where the leading shutter 20A recedes from the opening 11 and a closed position where the leading shutter 20A closes the opening 11. The leading shutter 20A is moved between the receded position and the closed position by the actuator 70a. The gears 40b and 50b, the drive lever 55b, and the trailing shutter 20B each have the similar configuration.

The gears 40a and 40b are provided with thin plates 45a and 45b, respectively. The thin plates 45a and 45b rotate together with the gears 40a and 40b, respectively. The thin plates 45a and 45b each have a fan shape. The sensors 60a and 60b detect whether or not the thin plates 45a and 45b pass through the sensors 60a and 60b to detect the positions of the leading shutter 20A and the trailing shutter 20B, respectively.

Also, the arms 31a and 31b are connected with respective springs Sa and Sb. Specifically, one end of the spring Sa is connected with the arm 31a, and the other end is connected with the board 10. One end of the spring Sb is connected with the arm 31b, and the other end is connected with the board 10. These springs Sa and Sb bias the arms 31a and 31b to move the leading shutter 20A and the trailing shutter 20B away from the opening 11, respectively. The springs Sa and Sb are respective examples of first and second biasing members.

Figure 3:
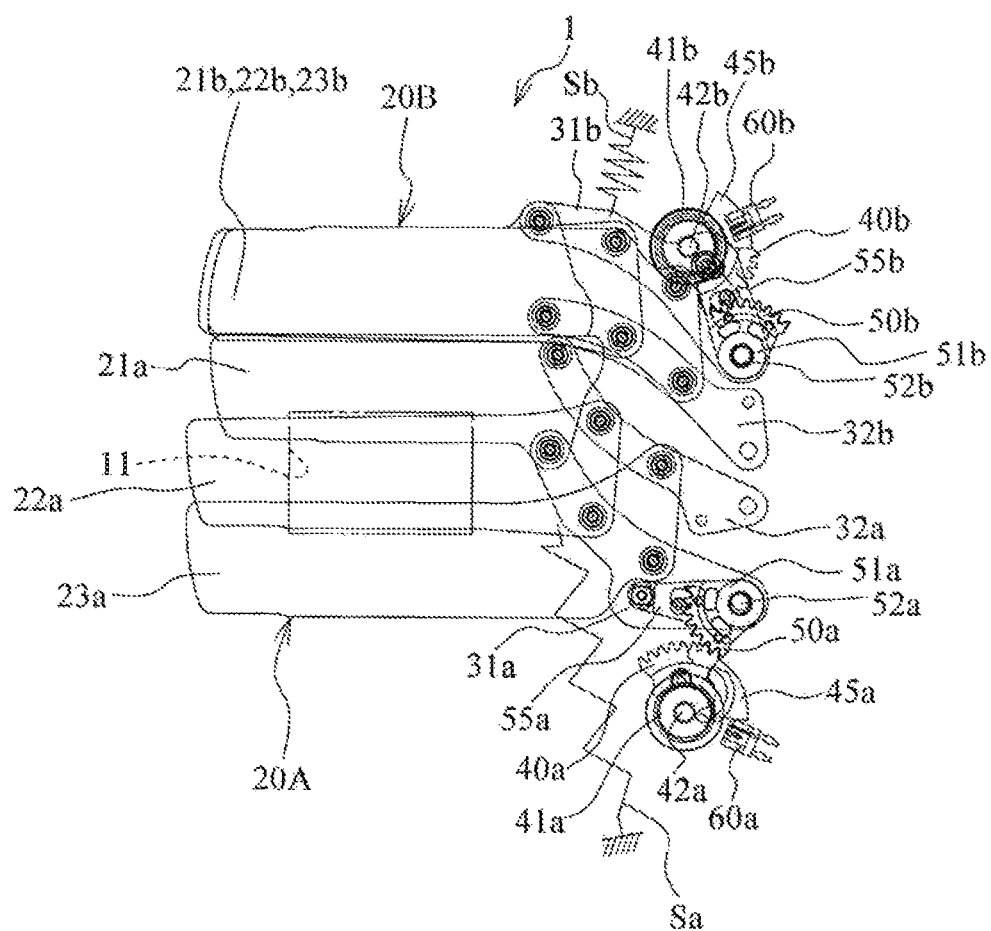
FIG. 3 is an explanatory view of an operation of the focal plane shutter.
Figure 4:
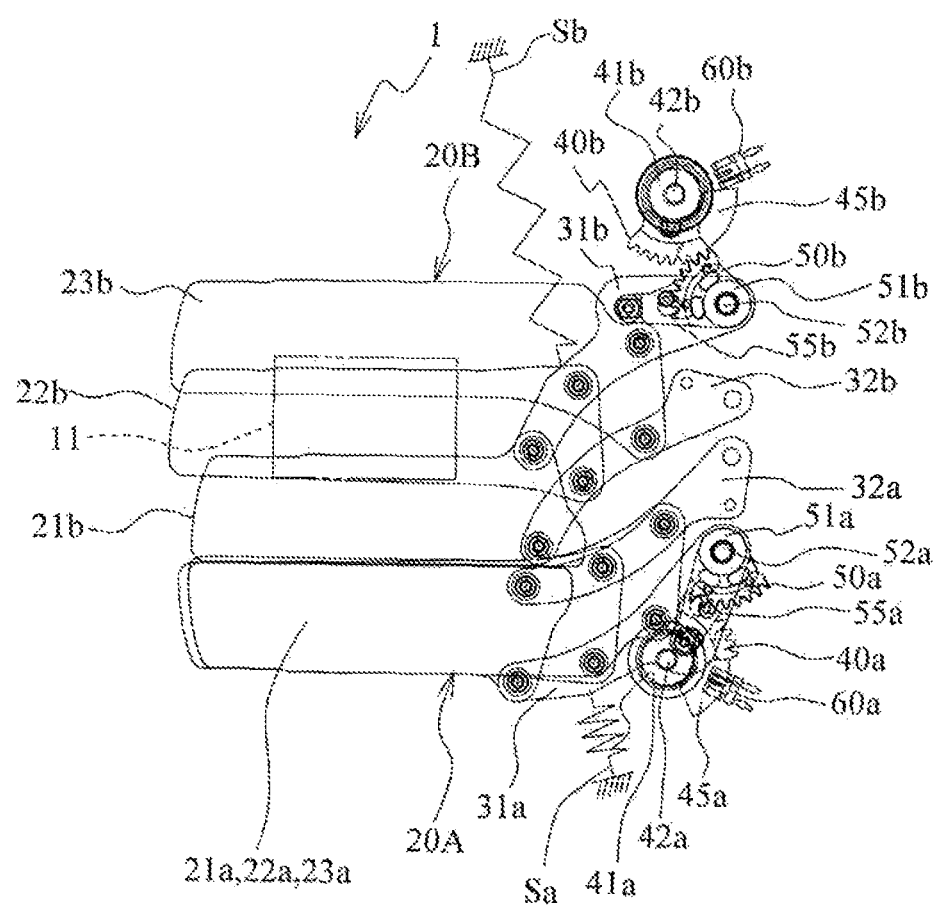
FIG. 4 is an explanatory view of the operation of the focal plane shutter.

Next, operation of the focal plane shutter 1 will be described. FIGS. 2 to 4 are explanatory views of the operation of the focal plane shutter 1. In a wait state, as illustrated in FIG. 2, the leading shutter 20A and the trailing shutter 20B are positioned at the respective receded positions, and the opening 11 is maintained in the fully opened state. Additionally, in the wait state as illustrated in FIG. 2, the leading shutter 20A and the trailing shutter 20B are maintained by the springs Sa and Sb at the positions to recede from the opening 11, respectively.

The camera A is adaptable to a live view mode of displaying images from an image pickup element on a crystal liquid monitor or the like in real time. That is, the camera A is a digital camera. Thus, in the live view mode, the state illustrated in FIG. 2 is maintained. The springs Sa and Sb can maintain the leading shutter 20A and the trailing shutter 20B at the receded positions away from the opening 11, even when the actuators 70a and 70b are in the non-energized states. This prevents the leading shutter 20A and the trailing shutter 20B from moving toward the opening 11, for example, even when the impact is applied to the camera A in the live view mode.

When a release switch of the camera A is pushed, a charging operation starts. When the charging operation starts, a coil of the actuator 70a is energized such that the leading shutter 20A moves and closes the opening 11. Specifically, the gear 40a rotates counterclockwise, and then the gear 50a rotates clockwise, which causes the arm 31a to drive. At this time, the arm 31a moves against the biasing force of the spring Sa.

After that, the coil of the actuator 70a stops being energized in the state where the leading shutter 20A closes the opening 11 and the trailing shutter 20B recedes from the opening 11. In such a way, the charging operation is finished. FIG. 3 illustrates the focal plane shutter 1 in the state where the charging operation is finished. In FIG. 3, the leading shutter 20A is positioned at the closed position, and the trailing shutter 20B is positioned at the receded position.

After a predetermined waiting period elapses from the time when the charging operation is finished, an exposure operation starts. The control portion 110 instructs the drive control portion 170 to energize the coil of the actuator 70a such that the leading shutter 20A moves and opens the opening 11. Specifically, the gear 40a drives clockwise, so the gear 50a drives counterclockwise. At this time, the arm 31a moves in the same direction as the biasing direction of the spring Sa, and the leading shutter 20A moves. The control portion 110 detects the change in the output signal from the sensor 60a, thereby detecting that the leading shutter 20A moves away from the opening 11. When the leading shutter 20A recedes from the opening 11, the state illustrated in FIG. 2 is shifted again.

After a predetermined period elapse from the time when the control portion 110 detects that the leading shutter 20A moves away from the opening 11 based on the sensor 60a, the control portion 110 energizes the coil of the actuator 70b to start moving the trailing shutter 20B. The arm 31b moves in the opposite direction of the biasing force of the spring Sb, and the trailing shutter 20B moves. Therefore, the trailing shutter 20B moves to close the opening 11. When the leading shutter 20A fully recedes from the opening 11 and the trailing shutter 20B fully closes the opening 11, the energization of the coils of the actuators 70a and 70b is cut. FIG. 4 illustrates the state where the leading shutter 20A is positioned at the receded position and the trailing shutter 20B is positioned at the closed position. In such a way, the exposure operation is finished.

After the exposure operation is finished, the data are output to a RAM of the control portion 110 or a memory of the camera. Next, the coil of the actuator 70b is energized so that the trailing shutter 20B moves away from the opening 11 to maintain the opening 11 in the fully opened state, whereby the state returns to the waiting state illustrated in FIG. 2.

In this way, after a predetermined period elapse from the time when the control portion 110 detects that the moving leading shutter 20A passes through a predetermined position, the control portion 110 energizes the coil of the actuator 70b to start moving the trailing shutter 20B. The above description has described the position where the leading shutter 20A recedes from the opening 11 as a predetermined position in accordance with the sensor 60a. However, a predetermined position is not limited to this.

In such a way, in the exposure operation, the leading shutter 20A moves away from the opening 11 while the leading shutter 20A is assisted by the biasing force of the spring Sa, and the trailing shutter 20B closes the opening 11 against the biasing force of the spring Sb. That is, in the exposure operation, the actuator 70a causes the leading shutter 20A to move while the leading shutter 20A is assisted by the spring Sa, whereas the actuator 70b causes the trailing shutter 20B to move against the biasing force of the spring Sb. Therefore, the load on the actuator 70a is smaller than that on the actuator 70b. Herein, under the same drive conditions of the actuators 70a and 70b, for example, under the condition where the same value of the electric current is applied thereto, the repeated shooting might cause the increase in the heat amount difference between the actuators 70a and 70b. This might cause the variations in the operation properties of the actuators 70a and 70b, and the drive speeds of the leading shutter 20A and the trailing shutter 20B might be changed. Therefore, for example, when the continuous shooting is performed for a predetermined period, the shutter speed might be changed due to the change in the driving properties of the actuators 70a and 70b, thereby raising a problem such as deterioration in the image quality.

For example, in order to suppress the change in the driving properties of the actuators 70a and 70b in the above case, it is conceivable that a value of electrical power supplied to the actuator 70a is set different from that of electrical power supplied to the actuator 70b. For example, it is conceivable that a value of electrical power supplied to the actuator 70a is set smaller than that of electrical power supplied to the actuator 70b. In the present embodiment, the drive torque of the actuator 70a is smaller than that of the actuator 70b, and the substantially same value of electrical power supplied to the actuators 70a and 70b is set.

Figure 5A:
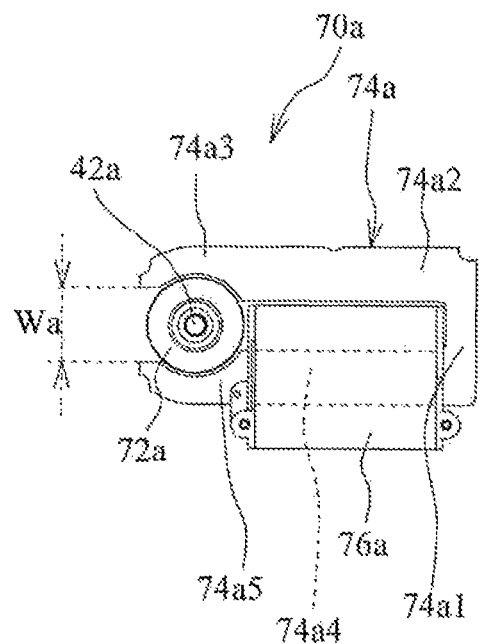
FIGS. 5A and 5B are explanatory views of actuators.
Figure 5B:
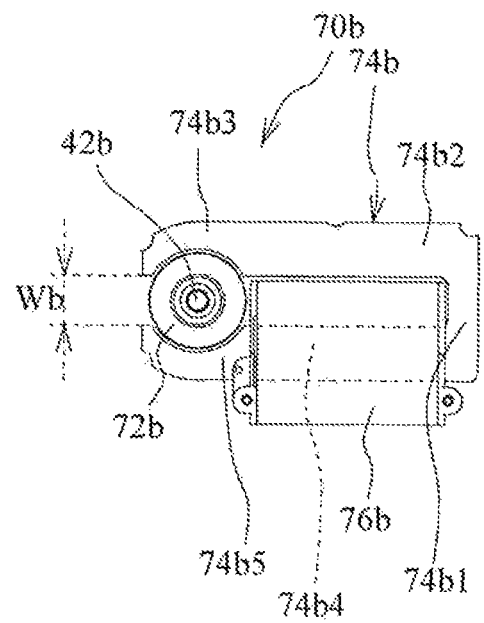

FIGS. 5A and 5B are explanatory views of the actuators 70a and 70b, respectively. The actuator 70a includes: a rotor 72a; a stator 74a excited to generate a magnetic force between the stator 74a and the rotor 72a; and a coil 76a for exciting the stator 74a. The rotor 72a is a permanent magnet magnetized to have different polarities in a circumferential direction. The rotor 72a is rotatably supported by the spindle 42a. The rotor 72a is secured to the gear 40a, so the rotation of the rotor 72a drives the leading shutter 20A. Likewise, the actuator 70b includes a rotor 72b, a stator 74b, and a coil 76b. The rotor 72b is rotatably supported by the spindle 42b, and is secured to the gear 40b. The rotation of the rotor 72b drives the trailing shutter 20B.

The stator 74a includes: a base portion 74a1 extending in a predetermined direction; leg portions 74a2 and 74a4 respectively extending from both ends of the base portion 74a1 in such a direction as to intersect the base portion 74a1; a magnetic portion 74a3 formed in an end portion of the leg portion 74a2; and a magnetic portion 74a5 formed in an end portion of the leg portion 74a4. A coil bobbin 78a around which the coil 76a is wound is assembled into the leg portion 74a4. The magnetic portions 74a3 and 74a5 face the rotor 72a. Specifically, the magnetic portions 74a3 and 74a5 have respective curved surfaces partially facing the outer circumferential surface of the rotor 72a. The energization of the coil 76a excites the magnetic portions 74a3 and 74a5 so as to have different polarities. This generates the magnetic force between the magnetic portions 74a3 and 74a5 and the rotor 72a, whereby the rotor 72a rotates. Likewise, the stator 74b includes a base portion 74b1, leg portions 74b2 and 74b4, and magnetic portions 74b3 and 74b5, and the energization of the coil 76b causes the rotor 72b to rotate.

As illustrated in FIGS. 5A and 5B, although the stators 74a and 74b differ from each other in shape, the rotors 72a and 72b are the same, and the coils 76a and 76b are the same. Further, the number of turns of the coil 76a is the same as that of the coil 76b. As illustrated in FIGS. 5A and 5B, the distance Wa between the end portions of the magnetic portions 74a3 and 74a5 is greater than the distance Wb between the end portions of the magnetic portions 74b3 and 74b5. Therefore, the curved surface area of the magnetic portions 74a3 and 74a5 facing the rotor 72a is smaller than that of the magnetic portions 74b3 and 74b5 facing the rotor 72b. Thus, when the same value of the electric current is supplied to the coils 76a and 76b, the drive torque of the rotor 72a is smaller than that of the rotor 72b.

Therefore, the drive torque of the actuator 70a is set smaller than that of the actuator 70b. Even when the springs Sa and Sb respectively bias the leading shutter 20A and the trailing shutter 20B to move away from the opening and the values of the electric power supplied to the actuators 70a and 70b are the same, it is thus possible to suppress the variation in the shutter speed.

In a way other than the above way, the drive torque of the actuator 70a may be smaller than that of the actuator 70b. For example, a minimum cross-sectional area of the stator of the actuator 70b may be made smaller than that of the stator 74b of the actuator 70b. The number of turns of the coil of the actuator 70a may be smaller that of the coil 76b. The coil of the actuator 70a may differ from that of the coil 76b in diameter or material. The rotor of the actuator 70a may differ from that of the rotor 72b in shape or material.

While the exemplary embodiments of the present invention have been illustrated in detail, the present invention is not limited to the above-mentioned embodiments, and other embodiments, variations and modifications may be made without departing from the scope of the present invention.

The control portion 110 and the drive control portion 170 may be achieved by a single IC tip.

In above embodiments, each of the leading shutter and the trailing shutter are composed of three blades, but not limited to this. For example, such a shutter may composed of two blades or more than three blades.

Finally, several aspects of the present invention are summarized as follows.

According to an aspect of the present invention, there is provided a focal plane shutter including: a board including an opening; a leading shutter and a trailing shutter opening and closing the opening; first and second biasing members respectively biasing the leading shutter and the trailing shutter to move away from the opening; a first actuator causing the leading shutter to move from a position to close the opening to a position to recede from the opening while the leading shutter is assisted by a biasing force of the first biasing member in an exposure operation; and a second actuator causing the trailing shutter to move from a position to recede from the opening to a position to close the opening against a biasing force of the second biasing member in the exposure operation, wherein drive torque of the first actuator is smaller than that of the second actuator. This suppresses the difference in moving speed between the leading shutter moved by the first actuator and the trailing shutter moved by the second actuator.

According to another aspect of the present invention, there is provided an imaging device including the above focal plane shutter.

According to another aspect of the present invention, there is provided a digital camera including the above focal plane shutter.

What is claimed is:

1. A focal plane shutter comprising:
   a board including an opening;
   a leading shutter and a trailing shutter opening and closing the opening;
   first and second arms respectively connected to the leading shutter and the trailing shutter;
   first and second biasing members respectively maintaining the leading shutter and the trailing shutter in a fully opened state;
   a first actuator causing the leading shutter to move from a position to close the opening to a position to recede from the opening while the leading shutter is assisted by a biasing force of the first biasing member in an exposure operation; and
   a second actuator causing the trailing shutter to move from a position to recede from the opening to a position to close the opening against a biasing force of the second biasing member in the exposure operation,
   wherein drive torque of the first actuator is smaller than that of the second actuator, and
   wherein the first and second actuators include first and second rotors for moving the leading shutter and the trailing shutter, respectively.

2. The focal plane shutter of claim 1, wherein the first and second actuators respectively include first and second stators, and the first and second stators differs from each other in shape.

3. The focal plane shutter of claim 1, wherein the substantially same amount of electric power is supplied to the first and second actuators.

4. An imaging device comprising a focal plane shutter comprising:
- a board including an opening;
- a leading shutter and a trailing shutter opening and closing the opening;
- first and second arms respectively connected to the leading shutter and the trailing shutter;
- first and second biasing members respectively maintaining the leading shutter and the trailing shutter in a fully opened state;
- a first actuator causing the leading shutter to move from a position to close the opening to a position to recede from the opening while the leading shutter is assisted by a biasing force of the first biasing member in an exposure operation; and
- a second actuator causing the trailing shutter to move from a position to recede from the opening to a position to close the opening against a biasing force of the second biasing member in the exposure operation, wherein drive torque of the first actuator is smaller than that of the second actuator, and wherein the first and second actuators include first and second rotors for moving the leading shutter and the trailing shutter, respectively.

5. A digital camera comprising a focal plane shutter comprising:
- a board including an opening;
- a leading shutter and a trailing shutter opening and closing the opening;
- first and second arms respectively connected to the leading shutter and the trailing shutter;
- first and second biasing members respectively maintaining the leading shutter and the trailing shutter in a fully opened state;
- a first actuator causing the leading shutter to move from a position to close the opening to a position to recede from the opening while the leading shutter is assisted by a biasing force of the first biasing member in an exposure operation; and
- a second actuator causing the trailing shutter to move from a position to recede from the opening to a position to close the opening against a biasing force of the second biasing member in the exposure operation, wherein drive torque of the first actuator is smaller than that of the second actuator, and wherein the first and second actuators include first and second rotors for moving the leading shutter and the trailing shutter, respectively.

\* \* \* \* \*